Dec. 13, 1927.

F. C. MORROW

FEEDING APPARATUS

Filed Jan. 13, 1926

F. C. Morrow
Inventor

By C. A. Snow & Co.
Attorney

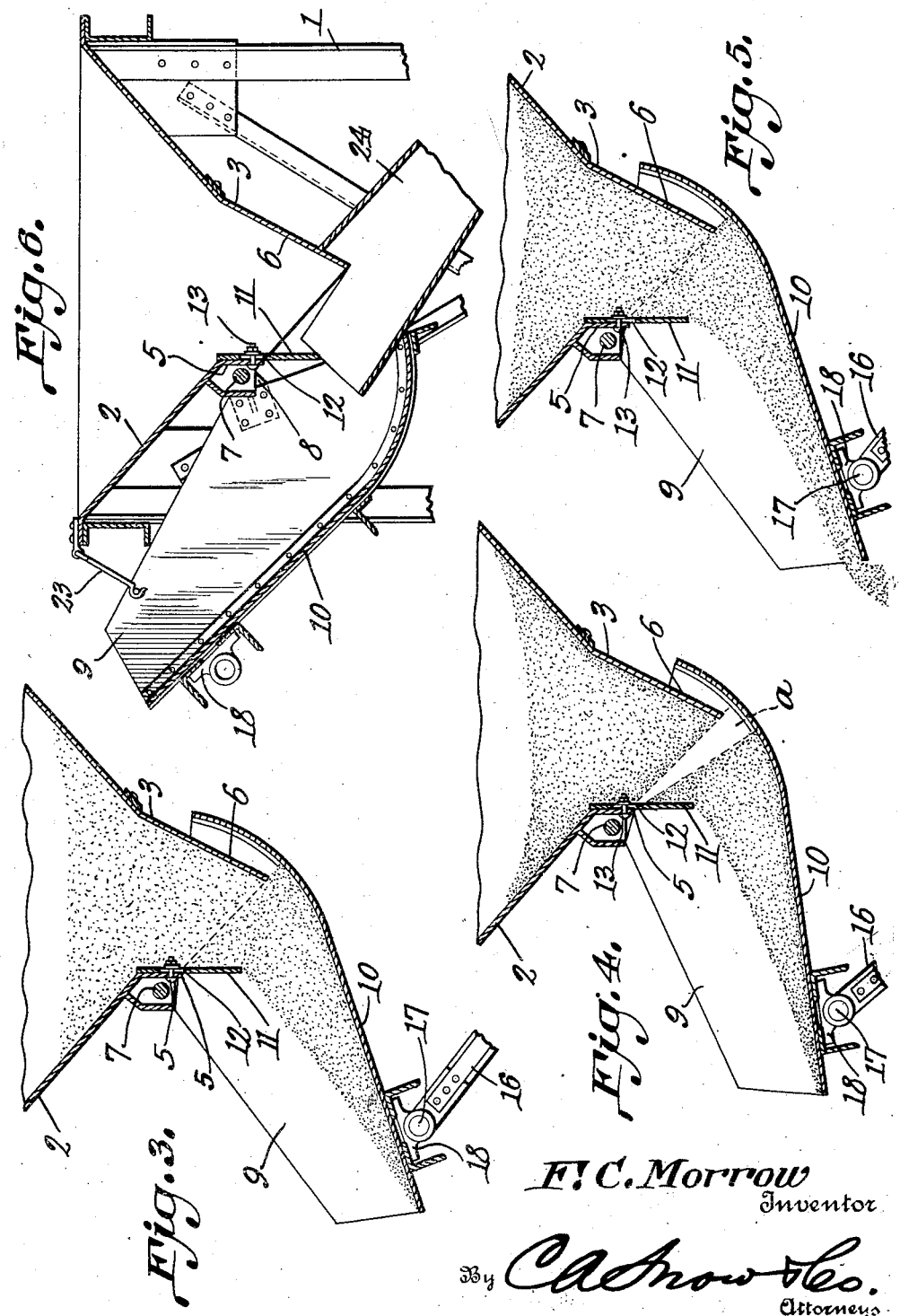

Patented Dec. 13, 1927.

1,652,250

UNITED STATES PATENT OFFICE.

FRANK C. MORROW, OF WELLSTON, OHIO.

FEEDING APPARATUS.

Application filed January 13, 1926. Serial No. 81,011.

This invention relates to apparatus designed primarily for feeding sand, gravel and other bulk materials.

Heretofore materials of this type have been handled by feeders of the flight conveyor type or of the reciprocating type but these mechanisms have been open to serious objections for several reasons. First, they require many working parts and there are a number of joints and bearings which must be lubricated. The sand or other bulk material works into the joints and causes considerable trouble. Second, there has been difficulty in preventing the bulk material from leaking through the apparatus and becoming wasted. Furthermore it has been almost impossible to accurately control the flow of material from the feeder.

It is an object of the present invention to overcome the objections heretofore present in machines of this character by providing a feeder which is simple and compact in construction, will not allow the bulk material to leak therefrom, and has the number of working parts reduced to the minimum.

A further object is to provide a means whereby the flow of material from the feeder can be controlled at will.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown. In said drawings, Figure 1 is a front elevation of the feeder.

Figure 3 is a section through a portion of the feeder showing the first position of the chute during the feeding operation.

Figure 4 is a similar view showing the second position of the chute during the feeding operation.

Figure 5 is a view similar to Figures 3 and 4 showing the third position of the chute during said operation.

Figure 6 is a section through a portion of the feeder showing the chute moved out of normal position to permit material to be delivered through a bypass chute.

Figure 1:
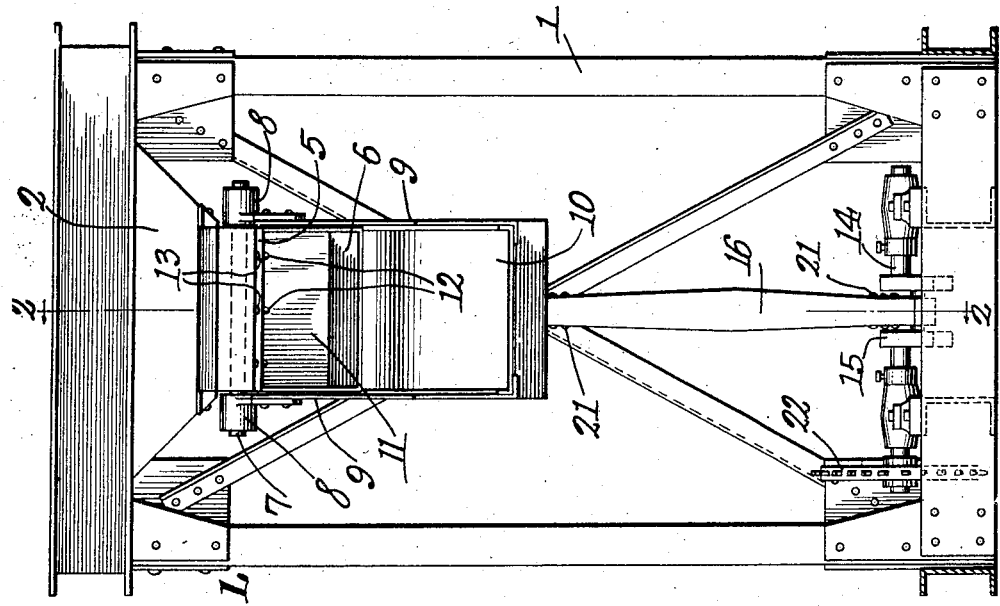
Figure 2:
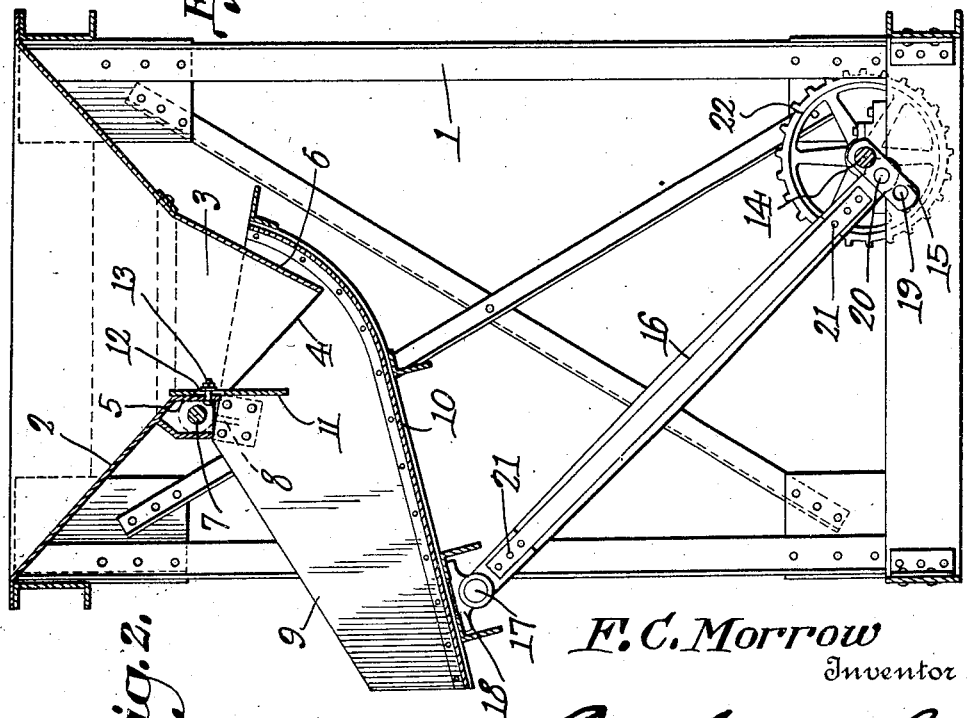
Figure 2 is a section on line 2—2 Figure 1.

Referring to the figures by characters of reference 1 designates a supporting structure in which is mounted a hopper 2 adapted to receive the bulk material to be fed from the apparatus. This hopper has a depending spout 3 the lower end of which is cut off obliquely as shown at 4 so that the front wall 5 of the spout is shorter than the back wall 6. A shaft 7 is supported in front of the front wall 5 of the spout and is engaged by brackets 8 extending upwardly from the side walls 9 of a delivery chute 10. The upper portion of the bottom of this delivery chute is concentric with the shaft 7 and is normally extended under and upwardly along the rear wall 6 of the spout 3, this bottom of the chute being at all times spaced from the spout. A baffle plate 11 is adjustably connected to the front wall 5 of the spout 3, it being provided with one or more slots 12 for the reception of one or more bolts 13 so the plate can be securely held in any position to which it may be adjusted vertically. Obviously by lowering or raising this plate relative to the wall 5 the flow of material through the lower end of the spout 3 can be varied.

A shaft 14 is journaled below the chute 10 and is preferably provided with a crank 15 to which is connected a pitman 16. The upper end of this pitman is pivotally connected as at 17 to a bracket 18 adjacent the forward end of the bottom 10 of the chute. If desired the pitman 16 can be adjustably connected to the crank 15 by providing said crank with two or more sets of apertures 19 for receiving the pivot pin 20. Other means for adjustably connecting the pitman to the crank can be used if desired. Furthermore the pitman can be adjustably connected to the pivot 17 by making it of one or more sections adjustably connected, as shown at 21. Thus the pitman can be lengthened or shortened as desired. It is to be understood that either of these adjustments can be used or both of them can be provided. Under some conditions neither adjustment is necessary.

Shaft 14 is adapted to be driven by any suitable means such as a chain, not shown, engaging a sprocket 22 secured to the shaft 14.

In operation the material to be fed through the machine is directed into the hopper 2 and will flow under the baffle 11 so as to pile upon the bottom 10 of the chute 9. This position of the material has been illustrated in Figure 3. As shaft 14 rotates the crank 15 will thrust through pitman 16 against the chute 9 so as to cause it to swing upwardly to the position shown in Figure 4. Thus the material supported by the chute will be swung upwardly therewith and away from the outlet end of the spout 3, thereby leaving a space $a$ into which additional material will flow from the spout so as to fill the space. As the shaft 14 continues to rotate pitman 16 will pull downwardly on the chute 9 and as the material on the chute cannot return to its initial position a portion thereof substantially equal to the amount which was fed into the space $a$, will be thrust off of the forward end of the chute as shown in Figure 5. By adjusting the baffle 11 upwardly or downwardly the amount of material delivered during each downward movement of the chute 9 can be controlled and a similar result can also be obtained by adjusting the length of the pitman 16 or the position of the pitman 16 with reference to the crank 15.

It has been found in practice that by providing a feeding mechanism such as described bulk material can be delivered in controllable quantity with no danger of loss through leakage. The number of bearings is reduced to the minimum and the mechanism will operate smoothly and require the minimum amount of attention. Because of the inert nature of the bulk material there is no danger of any portion thereof pushing upwardly through the space between the spout 3 and the rear curved portion of the bottom 10.

Should it be desired to by-pass the material directly from the hopper 12 without actuating the hinged spout 9, said spout could be elevated to the position shown in Figure 6 where it can be held by any suitable means provided for that purpose such as a hook 23. When the chute is thus positioned a by-pass chute 24 can be inserted between the spout 3 and the rear end of the chute 9 and against the baffle 11 as shown in Figure 6, so that the material, as it is directed downwardly through the spout 3 will enter the upper portion of the by-pass chute 24 and flow downwardly therethrough.

What is claimed is:

1. The combination with a holder for bulk material having an outlet, of a spout, and a removable by-pass chute extending between the outlet and the spout, said spout being mounted to swing relative to the holder into and out of position below the outlet when the by-pass chute is removed.

2. The combination with a holder for bulk material having an outlet and a baffle extending from the outlet, of a spout, means for supporting the spout in elevated position with a gap between the spout and the outlet of the holder, and a by-pass chute removably mounted between the outlet and the spout, said baffle constituting an abutment for the chute.

In testimony that I claim the foregoing as my own, I have hereto affixed my signature.

FRANK C. MORROW.